US011649001B2

(12) United States Patent
Zitt et al.

(10) Patent No.: US 11,649,001 B2
(45) Date of Patent: May 16, 2023

(54) KICKSTAND MOUNTED ALARM DEVICE (71) Applicants: Patrick Zitt, Knoxville, TN (US); James Protich, Nashville, TN (US)

(72) Inventors: Patrick Zitt, Knoxville, TN (US); James Protich, Nashville, TN (US)

(*) Notice: Subject to any disclaimer, the term of this patent is extended or adjusted under 35 U.S.C. 154(b) by 334 days.

(21) Appl. No.: 16/770,640

(22) PCT Filed: Dec. 8, 2017

(86) PCT No.: PCT/US2017/065221
§ 371 (c)(1),
(2) Date: Jun. 8, 2020

(87) PCT Pub. No.: WO2019/112598
PCT Pub. Date: Jun. 13, 2019

(65) Prior Publication Data
US 2020/0369336 A1 Nov. 26, 2020

(51) Int. Cl.
B62H 5/20 (2006.01)
B62J 45/41 (2020.01)
B62J 45/42 (2020.01)
B62H 1/02 (2006.01)

(52) U.S. Cl.
CPC ............ B62H 5/20 (2013.01); B62H 1/02 (2013.01); B62J 45/41 (2020.02); B62J 45/42 (2020.02)

(58) Field of Classification Search
CPC .... B62H 5/20; B62H 1/02; B62J 45/41; B62J 45/42
USPC ....................................................... 340/427
See application file for complete search history.

(56) References Cited

U.S. PATENT DOCUMENTS

| 3,882,453 A | 5/1975 | Mule |
| 4,276,540 A | 6/1981 | Habib, Jr. |
| 6,536,792 B2 | 3/2003 | Strasser |
| 7,468,667 B2 | 12/2008 | Moffett |

(Continued)

FOREIGN PATENT DOCUMENTS

GB 2389944 12/2003

OTHER PUBLICATIONS

International Search Report and Written Opinion of the International Search Authority for International Patent Application No. PCT/US17/65221, dated Mar. 1, 2018.

Primary Examiner — Jack K Wang
(74) Attorney, Agent, or Firm — Robinson IP Law, PLLC (57) ABSTRACT An alarm device for preventing theft of a vehicle having a kickstand support attached to the vehicle having: a housing associated with the kickstand support; a pressure sensing component located associated with the housing and adjacent an end of the kickstand for detecting a force of the kickstand on a ground surface, the pressure sensing component including a surface area for contacting the ground surface when the kickstand is in the deployed position; a controller in electronic communication with the pressure sensor for determining whether the kickstand is in contact with the ground surface based on measurements from the pressure sensing component; a communications module in electronic communication with the controller for wirelessly communicating with a user device. The controller generates an alarm when the kickstand is in the deployed position and determines that the force of the kickstand on the ground has changed by a threshold amount.

20 Claims, 10 Drawing Sheets (56) References Cited

U.S. PATENT DOCUMENTS

| | | | |
|---|---|---|---|
| 9,007,194 B1* | 4/2015 | Toews | B60R 25/1004 340/426.2 |
| 10,093,379 B2* | 10/2018 | Hines | B62K 21/12 |
| 10,780,931 B2* | 9/2020 | Siwicki | F15B 1/26 |
| 2007/0228829 A1* | 10/2007 | Konno | B60R 25/04 340/5.64 |
| 2010/0013186 A1 | 1/2010 | Markie | |
| 2011/0012726 A1 | 1/2011 | Jessiman et al. | |
| 2014/0125472 A1* | 5/2014 | Konno | B62H 5/001 340/427 |
| 2016/0180721 A1 | 6/2016 | Otulic | |
| 2017/0088098 A1* | 3/2017 | Frank | H04N 23/57 |
| 2019/0324446 A1* | 10/2019 | VanderZanden | G05D 1/0291 |
| 2020/0130771 A1* | 4/2020 | Jacobsz Rosier | B62K 23/02 |

\* cited by examiner

KICKSTAND MOUNTED ALARM DEVICE

FIELD

This disclosure relates to the field of anti-theft devices. More particularly, this disclosure relates to a pressure sensor for detecting movement of a motorcycle, scooter, bicycle, or other like wheeled vehicles.

BACKGROUND

Smaller vehicles such as motorcycles may be easily stolen by simply rolling the vehicle away from a parking spot. For example, a motorcycle may be rolled onto a trailer or other vehicle and subsequently transported away from an original parking location of the motorcycle. Preventing theft of a motorcycle may be difficult, and often discovery of the theft is only made when the owner returns to the original parking spot of the motorcycle.

Various attempts have been made to prevent theft of vehicles such as motorcycles. For example, a tilt sensor may be employed to detect movement of the vehicle corresponding to the vehicle being moved by an unauthorized person. However, tilt sensors may be overridden or confused, such as with magnets or a physical barrier. Further, these devices are often difficult to install and require complicated integration of the device within the vehicle.

Other types of devices may be located at a parking spot of the vehicle. For example, U.S. Pat. No. 4,276,540 describes an alarm system that is positioned on a support surface for engagement with a wheel of a vehicle. However, systems such as this are not attached to the vehicle and are not easily transported with the vehicle when parked at a separate location.

What is needed, therefore, is a system designed to be attached to a vehicle that alerts an owner of a vehicle to movement and potential theft of the vehicle.

SUMMARY

The above and other needs are met by an alarm device for detecting movement of a vehicle and generating an alert when unauthorized movement is detected. In a first aspect, an alarm device for preventing theft of a vehicle having a kickstand support attached to the vehicle and movable between a stowed position and a deployed position includes: a housing associated with the kickstand support; a pressure sensing component located associated with the housing and adjacent an end of the kickstand for detecting a force of the kickstand on a ground surface, the pressure sensing component including a surface area for contacting the ground surface when the kickstand is in the deployed position; a controller in electronic communication with the pressure sensor for determining whether the kickstand is in contact with the ground surface based on measurements from the pressure sensing component; a communications module in electronic communication with the controller for wirelessly communicating with a user device. The controller generates an alarm when the kickstand is in the deployed position and determines that the force of the kickstand on the ground has changed by a threshold amount.

In one embodiment, the alarm device further includes a GPS module in electronic communication with the controller for providing a location of the alarm device and attached vehicle.

In another embodiment, the communications module further transmits a location of the alarm device and associated vehicle when the controller generates the alarm based on a location detected by the GPS module.

In yet another embodiment, the user device further includes a display, a processor, one or more computer readable storage mediums, and a user interface operable on the user device for inputting parameters of the alarm device. In one embodiment, the parameters are selected from the group consisting of user contact information and pressure sensing module parameters.

In another embodiment, the alarm device further includes a position sensor in electronic communication with the controller and attached to one of the vehicle and kickstand for detecting whether the kickstand is in the stowed and deployed positions.

In yet another embodiment, the controller generates an alarm when the position sensor detects that the kickstand is in the deployed position and determines that the force of the kickstand on the ground has changed by a threshold amount.

In one embodiment, the controller arms the alarm device when the kickstand is in the deployed position and the controller determines that the pressure sensing component is detecting a force of the kickstand on the ground.

In another embodiment, the alarm device is in electronic communication with an electronic control module of the vehicle to prevent operation of the vehicle when the controller generates the alarm.

In yet another embodiment, the alarm device further includes an antenna in electronic communication with the controller for detecting a proximity of a transmitter associated with an operator to the alarm device.

In one embodiment, the alarm device is deactivated when the antenna detects the transmitter associated with the operator is within a threshold proximity of the alarm device. In another embodiment, the user device comprises the transmitter associated with the operator. In yet another embodiment, the antenna and transmitter communicate via a Bluetooth protocol.

In one embodiment, the alarm device is deactivated via the user device.

In a second aspect, a method of detecting theft of a vehicle having a kickstand support attached to a vehicle, the kickstand movable between a deployed position and a stowed position includes: providing an alarm device associated with the kickstand of the vehicle, the alarm device including a pressure sensing component for detecting a force of the kickstand on a ground surface, the pressure sensing component including a surface area for contacting the ground surface when the kickstand is in the deployed position; arming the alarm device when the kickstand is in the deployed position and when the pressure sensing component detects a force of the kickstand on the ground surface; generating an alarm when the alarm device determines that a force of the kickstand on the ground surface has changed by a threshold amount.

In one embodiment, the method further includes providing a user device associated with an operator of the vehicle and transmitting the alarm to the user device when the alarm is generated by the alarm device.

In another embodiment, the method further includes deactivating the alarm with the user device. In yet another embodiment, the method includes deactivating the alarm when the alarm device detects that the user device is within a threshold proximity of the alarm device.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
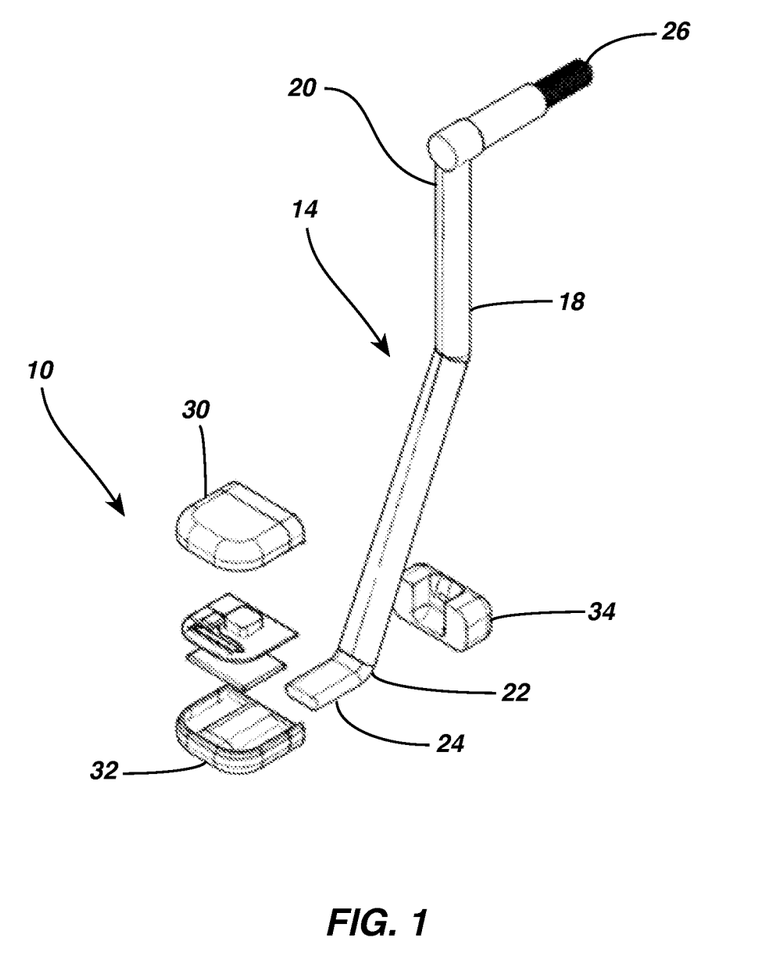
FIG. 1 shows an exploded view of an alarm device according to one embodiment of the present disclosure.

FIG. 1 shows a basic embodiment of an alarm device 10 for preventing theft of a vehicle 12 (FIG. 2), preferably a motorcycle, by detecting a force exerted on a kickstand 14 of the vehicle 12. The alarm device 10 may be installed on the kickstand 14 such that the alarm device 10 measures a force of the kickstand 14 on a ground surface S. The alarm device 10 is activated when the kickstand 14 is deployed, and may transmit an alert to a user when the alarm device 10 detects that the force on the kickstand 14 has changed, corresponding to potential theft or unauthorized use of the vehicle 12.

Figure 2:
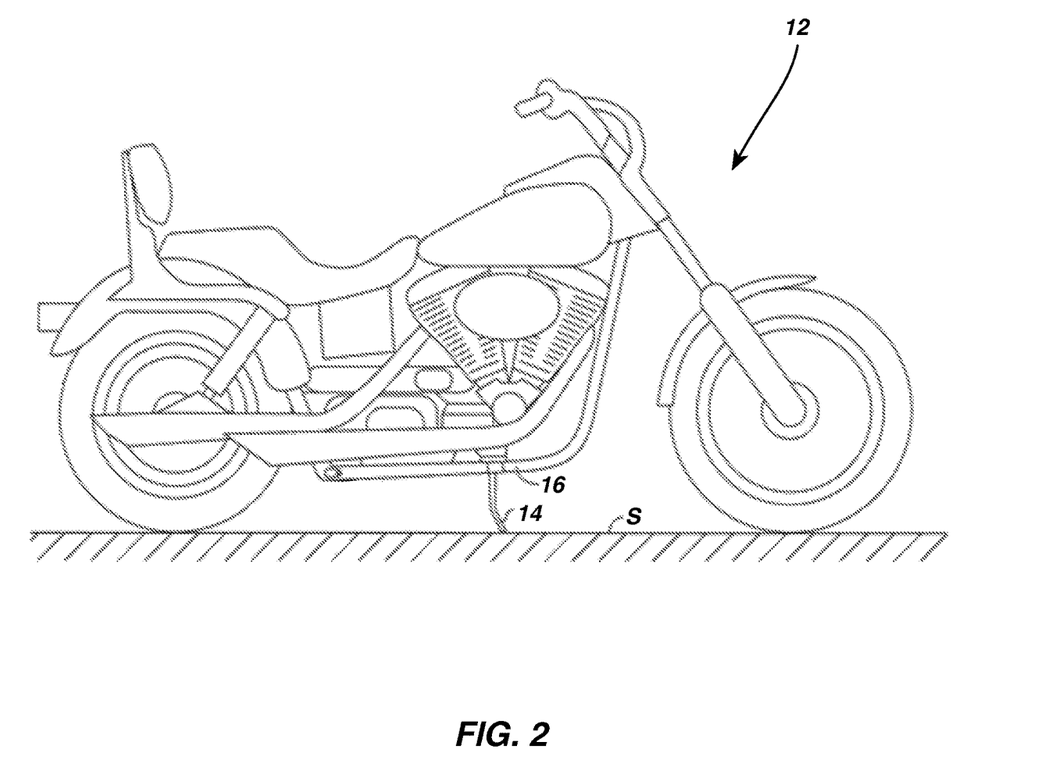
FIG. 2 shows vehicle having a deployed kickstand according to one embodiment of the present disclosure.

Referring to FIG. 2, the vehicle 12 is preferably a motorcycle or other two wheeled vehicle that relies on a support to maintain the vehicle 12 in an upright position when the vehicle 12 is not in use. While FIG. 2 illustrates the vehicle 12 as a motorcycle, it is also understood that embodiments of the alarm device 10 may be suitable for other similar vehicles, such as scooters and bicycles. The kickstand 14 is attached to a frame 16 of the vehicle 12 located along a bottom of the vehicle 12. The kickstand 14 is movable between a deployed position and a stowed position. In the deployed position, the kickstand 14 extends from the bottom of the vehicle 12 towards the ground surface S, thereby contacting the ground surface S to balance the vehicle 12 at rest. In the stowed position, the kickstand 14 is moved away from the ground surface S such that the kickstand 14 does not contact the ground surface S during operation of the vehicle 12. The kickstand 14 may be movable between the deployed and stowed positions such as by pivoting the kickstand 14 relative to the vehicle 12. However, it is also understood that various other suitable kickstands or supports for two-wheeled vehicles may be used as a kickstand for the vehicle 12.

Referring again to FIG. 1, the kickstand 14 preferably includes an elongate support member 18 extending from a proximal end 20 to a distal end 22. A flattened portion 24 is preferably shaped such that a bottom surface of the flattened portion 24 contacts the ground surface S to support the vehicle 12 at rest. The elongate support member 18 may be angled relative to the vehicle 12 such that the kickstand 14 extends at least partially away from a side of the vehicle 12 for supporting the vehicle 12 at rest. The kickstand 14 may include a mount 26 located at the proximal end 20 of the kickstand 14 for attaching the kickstand 14 to the vehicle 12.

The alarm device 10 includes a housing 28 (FIG. 3) configured to be attached to the kickstand 14. In the embodiment illustrated in FIGS. 1 and 3, the housing 28 is shaped to fit around the flattened portion 24 of the kickstand 14 such that the alarm device 10 can measure force displacement along the flattened portion 24 of the kickstand 14 when the kickstand 14 is in the deployed position. The housing 28 may be provided in a clamshell configuration such that portions of the housing 28 attach around portions of the kickstand 14 to secure the alarm device 10 to the kickstand. For example, in FIGS. 1 and 3 the housing includes an upper clamshell portion 30, a lower clamshell portion 32, and a heel portion 34. The housing 32 may include a pocket 36 that is shaped to snugly receive the flattened portion 24 of the kickstand 14 within the pocket 36. Upper clamshell portion 30 is attached to the lower clamshell portion 32 around the flattened portion 24 of the kickstand 14. The heel portion 34 may then be attached to one or both of the upper clamshell portion 30 and lower clamshell portion 32. The heel portion 34 preferably includes a cutout 38 that is shaped to fit around a portion of the distal end 22 of the kickstand 14. The upper clamshell portion 30, lower clamshell portion 32, and heel portion 34 may be attached to one another such as with a snap fit, or may be secured with one or more fasteners or other fastening means such that the housing 28 is securely associated and engaged with the kickstand 14.

Figure 3:
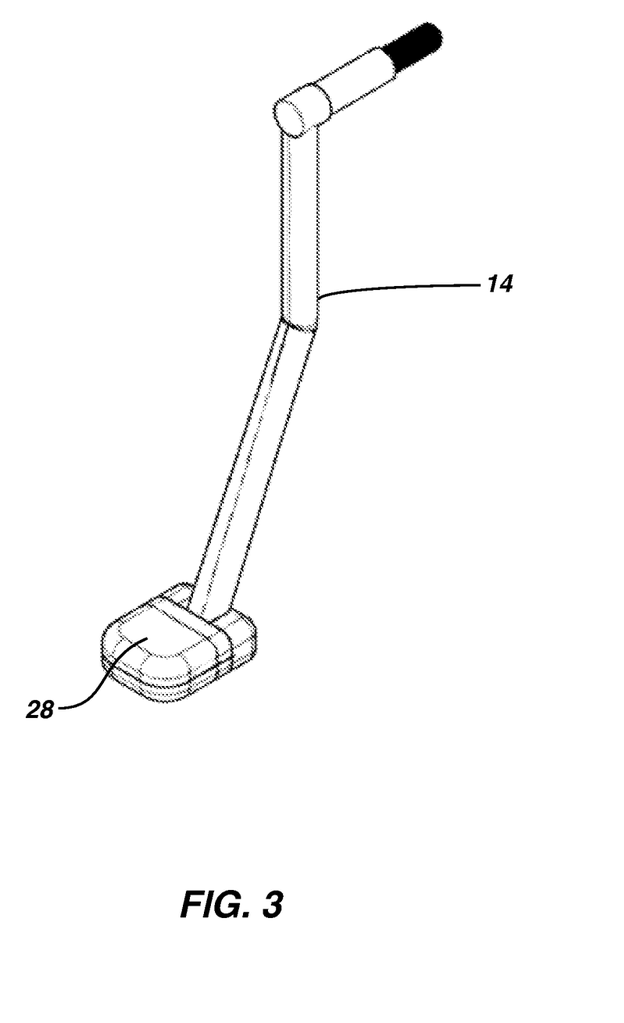
FIG. 3 shows a kickstand and alarm device according to one embodiment of the present disclosure.
Figure 4:
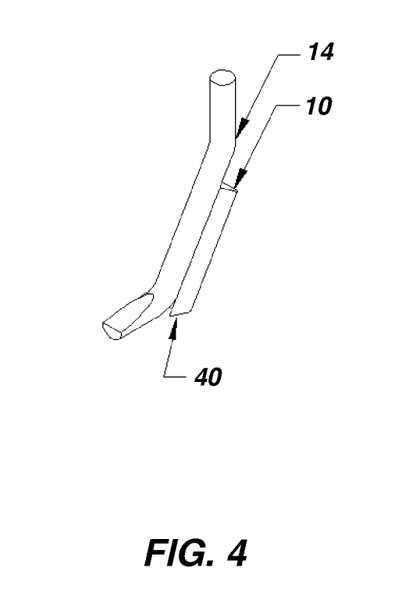
FIG. 4 shows an alarm device according to one embodiment of the present disclosure.

While FIGS. 1 and 3 illustrate one preferable embodiment wherein the alarm device 10 includes the housing 28 adapted to fit around the flattened portion 24 and distal end 22 of the kickstand 14, it is also understood that the alarm device 10 may be associated with the kickstand 14 in other similar configurations. For example, as shown in FIG. 4, the alarm device 10 may be oriented along a length of the elongate support member 18 of the kickstand 14 and include an end 40 that is adjacent to the flattened portion 24 for detecting force displacement on the flattened portion 24 of the kickstand 14. Further, while FIGS. 1 and 3 illustrate clamshell portions of the housing 28 fitting around the kickstand 14, the housing 28 may alternatively be attached to the kickstand 14, such as with one or more fasteners or by adhering the housing 28 to the kickstand 14. Other embodiments may include orienting the housing 10 along other portions of the kickstand 14 or vehicle 12 such that a force displacement on the kickstand 14 may be detected by the alarm device 10. In another embodiment, the alarm device 10 may be integrally formed as part of the kickstand 14, as discussed in greater detail below.

Figure 5:
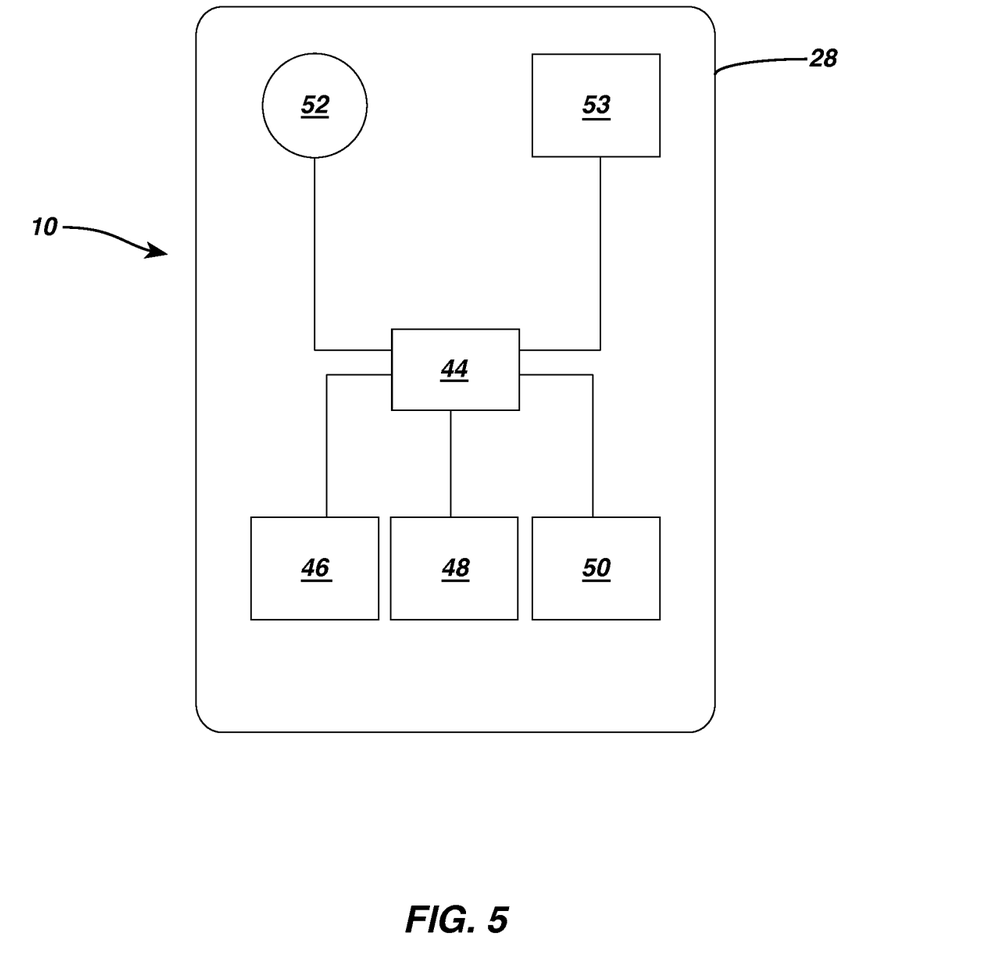
FIG. 5 is a schematic view of an alarm device according to one embodiment of the present disclosure.

The alarm device 10 includes an electronics module 42 including various components described below. The electronics module 42 is preferably located within the housing 28, as shown in FIG. 1. However, it is also understood that various electronic components of the electronics module 42 may be located remote from the housing 28, such as on the vehicle 12. Referring to FIG. 5, the alarm device 10 includes a controller 44. The controller 44 may include an embedded processor and one or more computer readable storage mediums for receiving input from various sensors and generating instructions as described herein. The controller 44 is in electronic communication with a force sensor 46.

Figure 6A:
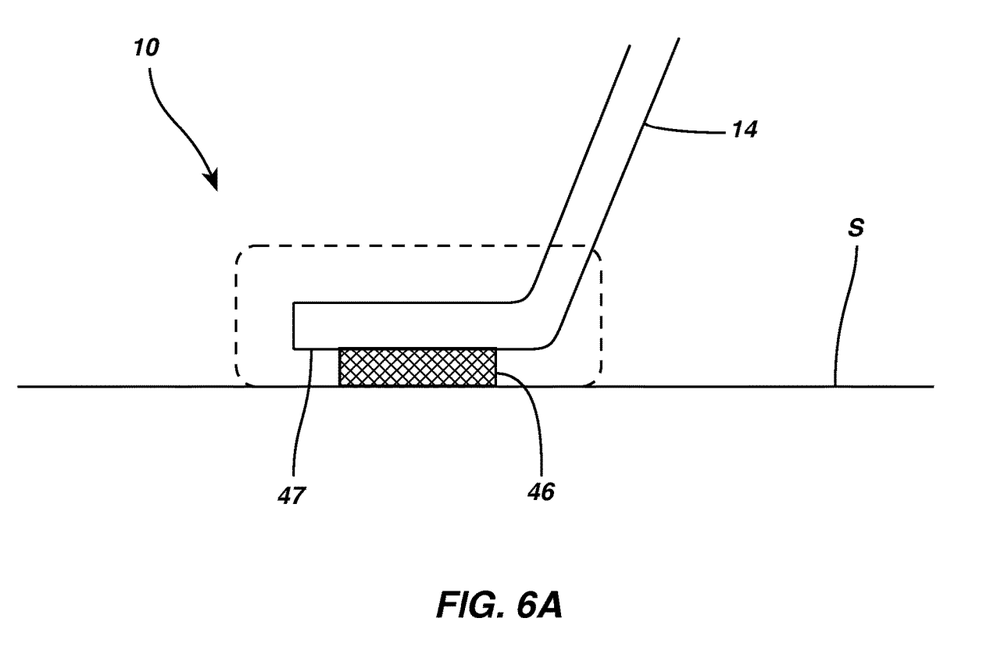
FIGS. 6A and 6B show a side view of an alarm device according to one embodiment of the present disclosure.
Figure 6B:
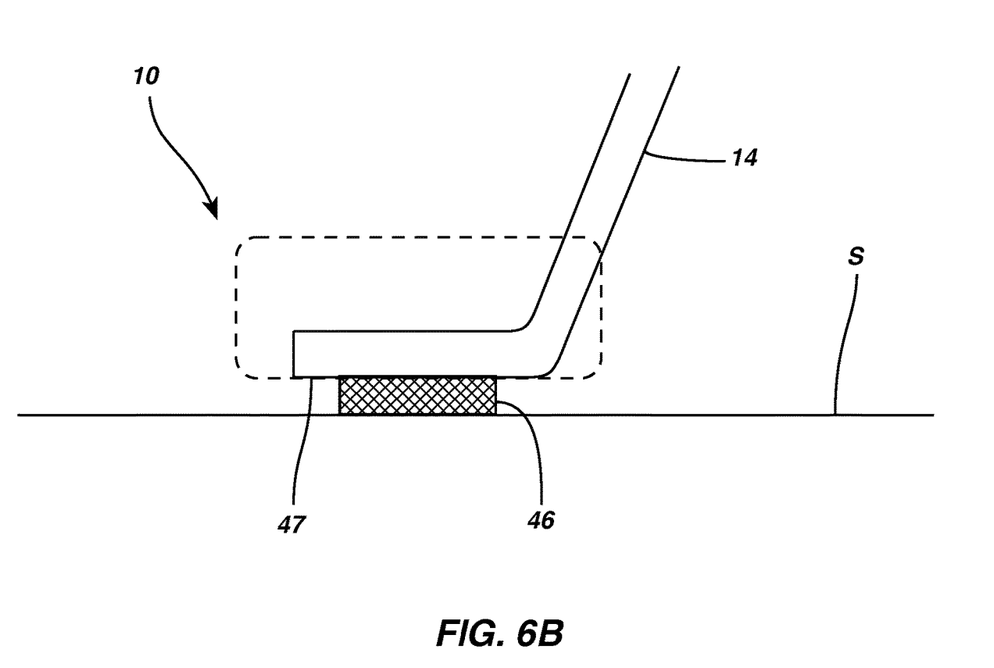

The force sensor 46 measures force applied to the force sensor 46 using one or more of a piezoresistive strain gage, capacitive, electromagnetic, or other like sensor capable of measuring a force applied over an area of the force sensor 46. The force sensor 46 is preferably located within the housing 28 between a bottom surface 47 of the kickstand 14 and the ground surface S, as shown in FIG. 6A. Alternatively, the force sensor 46 may be located on an outer surface of the housing 28 between the kickstand 14 and ground surface S for measuring a force applied to the kickstand 14, as shown in FIG. 6B. While FIGS. 6A and 6B illustrate exemplary placement of the force sensor 46, it is understood that various other locations on the kickstand 14 may be suitable for placement of the force sensor 46. For example, the force sensor 46 may be located adjacent the mount 26 of the kickstand 14 for measuring a force on the kickstand 14 adjacent the vehicle 12.

Referring again to FIG. 5, the controller 44 is also in electronic communication with a position module 48 for detecting a location of the alarm device 10 and associated vehicle 12. The position module 48 preferably includes one of a GPS and cellular antenna such that a location of the vehicle may be determined by GPS or with respect to nearby cellular towers (or other position tracking method or device). The alarm device further includes a communications module 50 in electronic communication with the controller 44 for transmitting and receiving data from the alarm device 10 as described below. The communications module 50 may operate using one or more of cellular, WiFi, Bluetooth®, and other known communication protocols. The alarm device 10 may further include a power source 52, such as a battery, for powering components of the alarm device 10. Alternatively, the alarm device 10 may be powered by a power source of the vehicle 12, such as an onboard battery of the vehicle 12 or a solar power source on a non-motorized bicycle. The alarm device 10 may further include a position sensor 53, such as an accelerometer or switch for detecting whether the kickstand 14 is in the deployed or stowed position.

Figure 7:
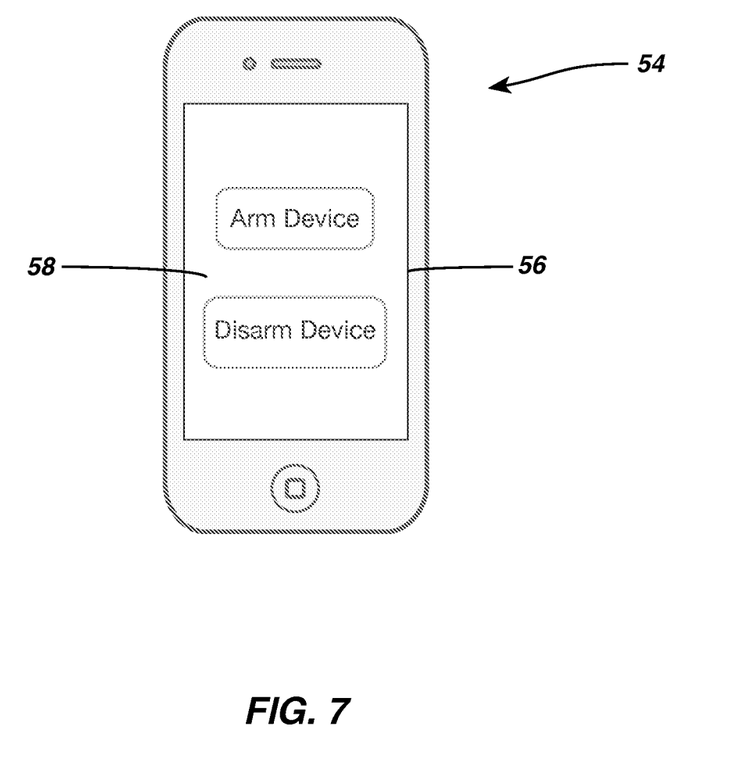
FIG. 7 shows a user device and user interface according to one embodiment of the present disclosure.

The alarm device 10 is configured to wirelessly communicate with a user device 54 (FIG. 7). The user device 54 may be, for example, a smart phone or other computing similar device of the user. The user device 54 is in wireless communication with the alarm device 10 via the communications module 50 of the alarm device. The user device 54 includes a display 56 and a user interface 58 operable on the user device 54 for activating the alarm device 10 and receiving an alert when the alarm device 10 generates an alarm condition as described herein. A user may input various parameters of the alarm device 10 through the user interface 58 of the user device 54. For example, the user may input a desired threshold force of the force sensor 46, adjust a sensitivity of the force sensor 46, designate one or more contacts for receiving alerts from the alarm device 10, and input other parameters related to the alarm device 10 and the generation of an alert.

Figure 8:
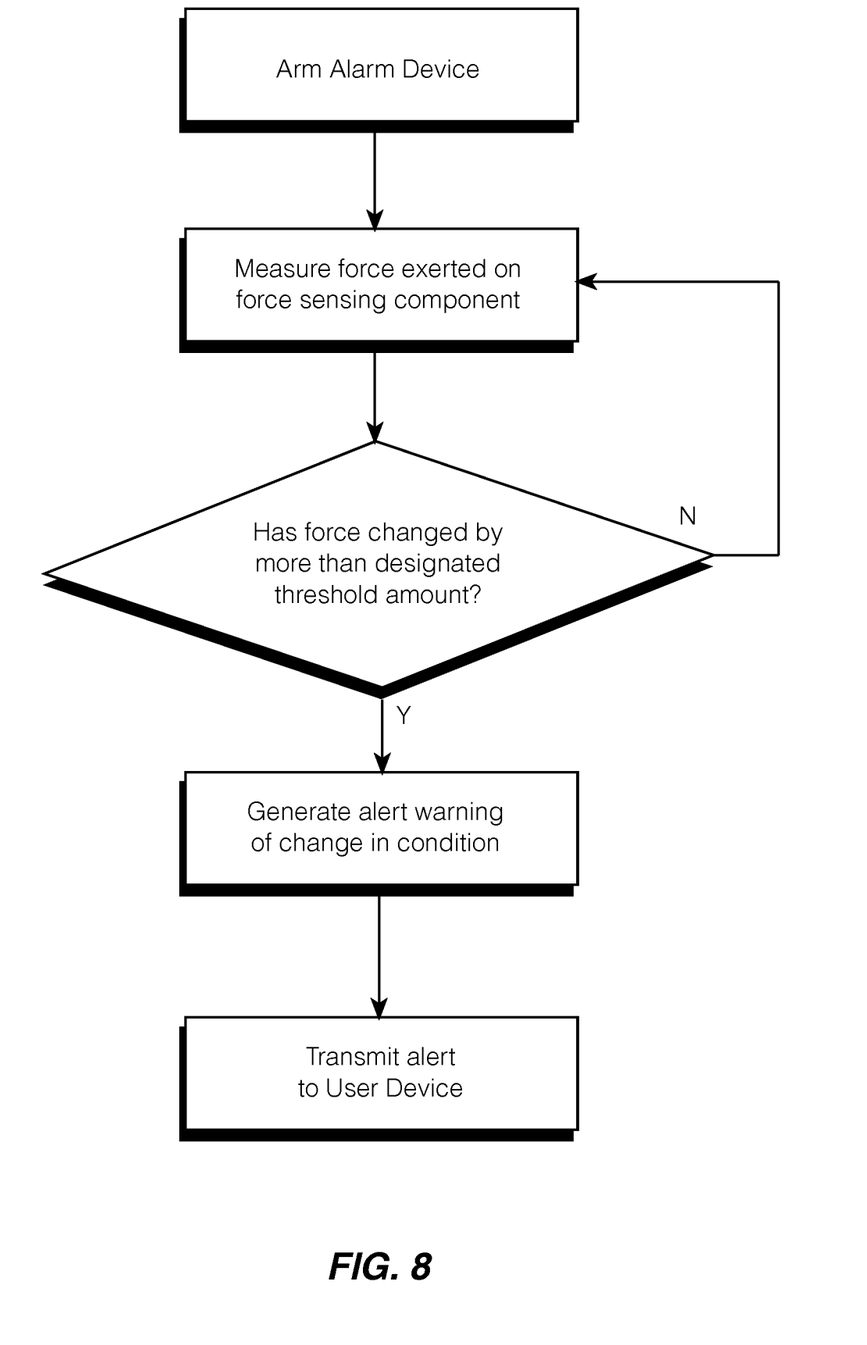
FIG. 8 shows a process of generating an alert using an alarm device according to one embodiment of the present disclosure.

Referring to FIG. 8, the alarm device 10 may be activated by a user such that the alarm device is in an armed condition. The alarm device 10 may be activated when the alarm device 10 is in the deployed position and a force is detected on the force sensor 46 of the alarm device 10. To arm the alarm device 10, the user may input instructions to arm the alarm device 10. Alternatively, the alarm device 10 may automatically enter an armed condition when the kickstand 14 is in the deployed position and a force is detected by the force sensor 46 of the alarm device 10.

When the alarm device 10 is armed, the controller 44 determines a force exerted on the force sensor 46 to determine whether the force on the force sensor 46 has changed more than a designated threshold amount. If the controller 44 determines that the force has not changed by greater than a threshold amount, the alarm device 10 remains in the armed condition. If the controller 44 determines that the force has changed by greater than the threshold amount, the controller 44 generates an alert. The alert may be emitted locally on the alarm device 10, such as an audible alert. Further, the alert may be transmitted to the user device 54 and displayed to the user on the user device 54. Further, the controller may transmit a location of the alarm device 10 when the alert is generated and may continue to transmit a location of the alarm device 10 until the alarm device 10 is deactivated.

Figure 9:
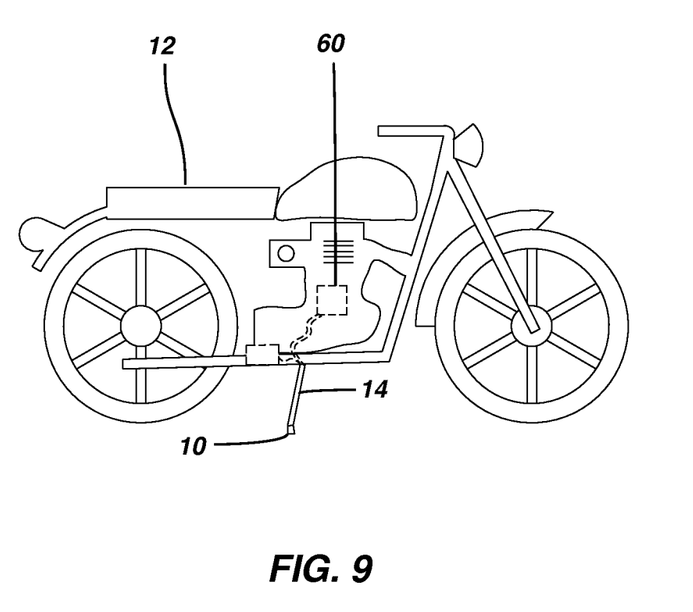
FIG. 9 shows an alarm device integrated into a kickstand in a deployed position according to one embodiment of the present disclosure.
Figure 10:
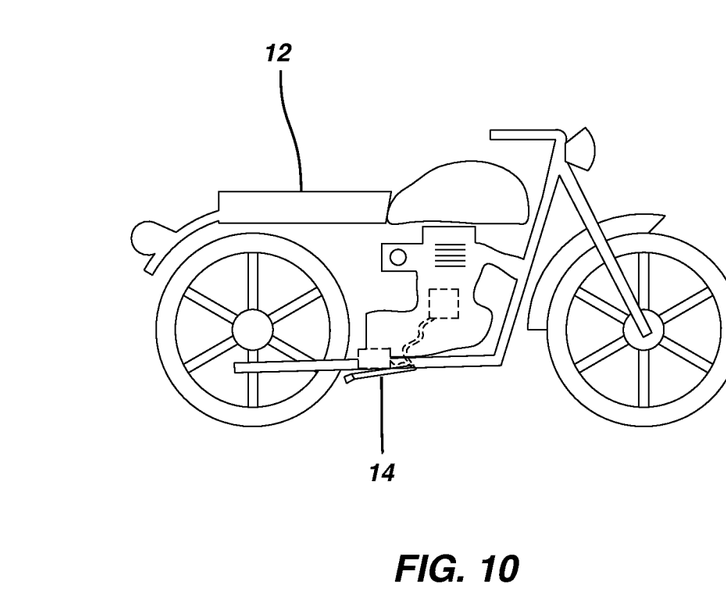
FIG. 10 shows an alarm device integrated into a kickstand in a stowed position according to one embodiment of the present disclosure.
Figure 11:
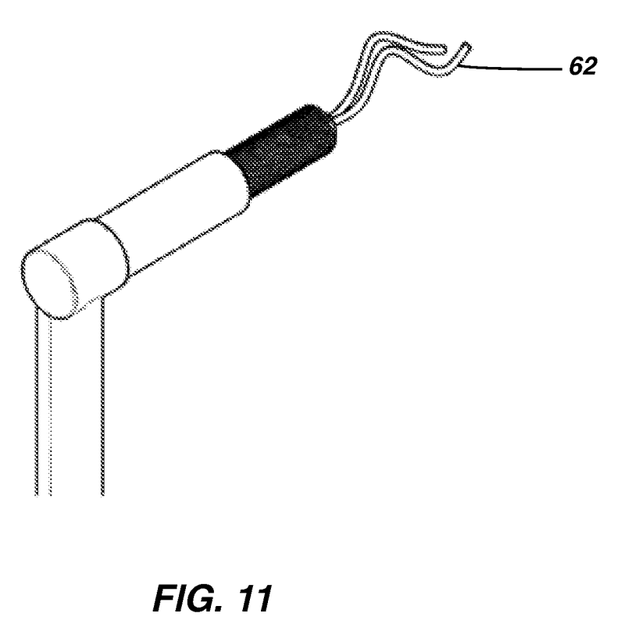
FIG. 11 shows a kickstand having an integral alarm device according to one embodiment of the present disclosure.

While the above describes an alarm device 10 that is attached to the kickstand 14 of the vehicle 12, it is also understood that the alarm device 10 of the present disclosure may be integrally formed with the kickstand 14 and vehicle 12. Referring to FIGS. 9 and 10, the alarm device 10 may be integrated into the vehicle 12, such as by being in electronic communication with an electronic control module (ECM) 60 of the vehicle 12. The alarm device 10 may include one or more wires 62 extending through the kickstand 14 to the ECM 60 of the vehicle 12. When the alarm device 10 is integrated into the vehicle 12, an alert generated by the alarm device 10 may cause the ECM to disable operation of the vehicle 12, thereby preventing theft of the vehicle 12.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. An alarm device for preventing theft of a vehicle having a kickstand support attached to the vehicle and movable between a stowed position and a deployed position, the alarm device comprising:

a housing attached to the kickstand support, the housing including a force sensor located at an end of the kickstand, the housing attached to the kickstand support such that the force sensor detects a force on the kickstand by a ground surface when the kickstand is in the deployed position;

a controller in electronic communication with the force sensor for determining whether the vehicle is supported on the kickstand based on measurements from the force sensor;

a communications module in electronic communication with the controller for wirelessly communicating with a user device;

wherein the controller generates an alarm when the kickstand is in the deployed position and the controller determines that the force of the kickstand on the ground has changed by a threshold amount.

2. The alarm device of claim 1, further comprising a GPS module in electronic communication with the controller for providing a location of the alarm device and attached vehicle.

3. The alarm device of claim 2, wherein the communications module further transmits a location of the alarm device and associated vehicle when the controller generates the alarm based on a location detected by the GPS module.

4. The alarm device of claim 1, the user device further comprising a display, a processor, one or more computer readable storage mediums, and a user interface operable on the user device for inputting parameters of the alarm device.

5. The alarm device of claim 4, wherein the parameters are selected from the group consisting of user contact information and parameters of the force sensor.

6. The alarm device of claim 1, further comprising a position sensor in electronic communication with the controller and attached to one of the vehicle and kickstand for detecting whether the kickstand is in the stowed and deployed positions.

7. The alarm device of claim 6, wherein the controller generates an alarm when the position sensor detects that the kickstand is in the deployed position and determines that the force of the kickstand on the ground has changed by the threshold amount.

8. The alarm device of claim 1, wherein the controller arms the alarm device when the kickstand is in the deployed position and the controller determines that the force sensor is detecting a force of the kickstand on the ground.

9. The alarm device of claim 1, wherein the alarm device is in electronic communication with an electronic control module of the vehicle to prevent operation of the vehicle when the controller generates the alarm.

10. The alarm device of claim 1, further comprising an antenna in electronic communication with the controller for detecting a proximity of a transmitter associated with an operator to the alarm device.

11. The alarm device of claim 10, wherein the alarm device is deactivated when the antenna detects the transmitter associated with the operator is within a threshold proximity of the alarm device.

12. The alarm device of claim 11, wherein the user device comprises the transmitter associated with the operator.

13. The alarm device of claim 10, wherein the antenna and transmitter communicate via a Bluetooth protocol.

14. The alarm device of claim 1, wherein the alarm device is deactivated via the user device.

15. The alarm device of claim 1, wherein the housing comprises a clamshell that is shaped to fit around a portion of the kickstand support of the vehicle.

16. The alarm device of claim 15, the clamshell comprising an upper half and a lower half, wherein the force sensor is located on the lower half of the clamshell.

17. A method of detecting theft of a vehicle having a kickstand support attached to a vehicle, the kickstand movable between a deployed position and a stowed position, the method comprising:

attaching an alarm device to the kickstand of the vehicle, the alarm device including a force sensor located on the kickstand, the alarm device attached to the kickstand such that the force sensor detects a force of the kickstand on a ground surface when the kickstand is in the deployed position;

arming the alarm device when the kickstand is in the deployed position and when the force sensor detects a force of the kickstand on the ground surface;

generating an alarm when the alarm device determines that a force of the kickstand on the ground surface has changed by a threshold amount.

18. The method of claim 17, further comprising:

providing a user device associated with an operator of the vehicle;

transmitting the alarm to the user device when the alarm is generated by the alarm device.

19. The method of claim 18, further comprising deactivating the alarm with the user device.

20. The method of claim 19, further comprising deactivating the alarm when the alarm device detects that the user device is within a threshold proximity of the alarm device.

* * * * *